United States Patent
So et al.

(10) Patent No.: US 8,341,375 B2
(45) Date of Patent: *Dec. 25, 2012

(54) METHODS FOR CONVERSION OF UPDATE BLOCKS BASED ON ASSOCIATION WITH HOST FILE MANAGEMENT DATA STRUCTURES

(75) Inventors: Bum Suck So, San Jose, CA (US); Shai Traister, Sunnyvale, CA (US)

(73) Assignee: SanDisk Technologies Inc., Plano, TX (US)

( * ) Notice: Subject to any disclaimer, the term of this patent is extended or adjusted under 35 U.S.C. 154(b) by 295 days.

This patent is subject to a terminal disclaimer.

(21) Appl. No.: 11/725,746

(22) Filed: Mar. 19, 2007

(65) Prior Publication Data

US 2008/0235439 A1    Sep. 25, 2008

(51) Int. Cl.
    *G06F 13/00* (2006.01)
(52) U.S. Cl. ............... 711/170; 711/103; 711/154
(58) Field of Classification Search .......... 711/103, 711/154
    See application file for complete search history.

(56) References Cited

U.S. PATENT DOCUMENTS

| | | | |
|---|---|---|---|
| 7,139,864 B2 | 11/2006 | Bennett et al. | |
| 7,383,375 B2 | 6/2008 | Sinclair | |
| 7,395,384 B2 | 7/2008 | Sinclair et al. | |
| 7,904,670 B2 | 3/2011 | Traister | |
| 2005/0144358 A1 | 6/2005 | Conley et al. | |
| 2005/0144360 A1* | 6/2005 | Bennett et al. | 711/103 |
| 2006/0020745 A1 | 1/2006 | Conley et al. | |
| 2006/0117154 A1 | 6/2006 | Suishu et al. | |
| 2008/0082728 A1* | 4/2008 | Traister et al. | 711/103 |
| 2008/0082775 A1* | 4/2008 | Gorobets | 711/170 |
| 2008/0091871 A1 | 4/2008 | Bennett et al. | |
| 2008/0235437 A1 | 9/2008 | Gorobets | |
| 2008/0235463 A1* | 9/2008 | Traister | 711/154 |
| 2008/0235464 A1* | 9/2008 | Traister | 711/154 |
| 2008/0235465 A1* | 9/2008 | So et al. | 711/154 |
| 2008/0235489 A1 | 9/2008 | Gorobets | |

OTHER PUBLICATIONS

Unpublished U.S. Appl. No. 11/549,060, Bennett et al.
Shutterbug, <http://www.shutterbug.com/industryvoice/1105kingston/index1.html> (visited Mar. 16, 2007).
Kawaguchi, Atsuo, Nishioka, Shingo, and Motoda, Hiroshi, *A Flash-Memory Based File System*, White Paper, Advanced Research laboratory, Hitachi, Ltd.
U.S. Office Action mailed Jun. 25, 2009 in U.S. Appl. No. 11/725,628.
U.S. Office Action mailed Jun. 24, 2009 in U.S. Appl. No. 11/725,670.
U.S. Office Action mailed Jun. 25, 2009 in U.S. Appl. No. 11/725,745.
U.S. Office Action mailed Jun. 24, 2009 in U.S. Appl. No. 11/725,720.

(Continued)

*Primary Examiner* — Reba I Elmore
(74) *Attorney, Agent, or Firm* — Weaver Austin Villeneuve & Sampson LLP

(57) ABSTRACT

A method for operating a memory system is provided. In this method, a sequential update block is provided and a write command is received to write data. The write command comprises a logical address associated with the data. If the logical address is associated with a host file management data structure, then the sequential update block is converted to a chaotic update block. After the conversion, the data are written to the chaotic update block.

12 Claims, 12 Drawing Sheets

OTHER PUBLICATIONS

U.S. Office Action mailed Jun. 24, 2009 in U.S. Appl. No. 11/725,625.
U.S. Office Action mailed Jan. 14, 2010 in U.S. Appl. No. 11/725,628.
U.S. Office Action mailed Jan. 6, 2010 in U.S. Appl. No. 11/725,670.
U.S. Final Office Action mailed Dec. 23, 2009 in U.S. Appl. No. 11/725,745.
U.S. Final Office Action mailed Dec. 22, 2009 in U.S. Appl. No. 11/725,720.
U.S. Final Office Action mailed Dec. 17, 2009 in U.S. Appl. No. 11/725,625.
U.S. Final Office Action mailed Jun. 11, 2010 in U.S. Appl. No. 11/725,628.
U.S. Final Office Action mailed Mar. 16, 2010 in U.S. Appl. No. 11/725,720.
U.S. Final Office Action mailed Mar. 25, 2010 in U.S. Appl. No. 11/725,625.
U.S. Office Action mailed Oct. 1, 2010 in U.S. Appl. No. 11/725,720.
U.S. Final Office Action mailed Mar. 2, 2011 in U.S. Appl. No. 11/725,720.
U.S. Notice of Allowance mailed Nov. 4, 2010 in U.S. Appl. No. 11/725,628.

* cited by examiner ial update block as destination for data received from write commands. Upon the first non-sequential write to the same logical group, the sequential update block is converted into a chaotic update block or is closed and a new update block is allocated.
METHODS FOR CONVERSION OF UPDATE BLOCKS BASED ON ASSOCIATION WITH HOST FILE MANAGEMENT DATA STRUCTURES

CROSS-REFERENCES TO RELATED APPLICATIONS

This application is related to U.S. patent application Ser. No. 11/725,628, filed on Mar. 19, 2007, and entitled "Methods for Conversion of Update Blocks Based on Comparison with a Threshold Size;" is related to U.S. patent application Ser. No. 11/725,670, filed on Mar. 19, 2007 and entitled "Systems for Conversion of Update Blocks Based on Comparison with a Threshold Size;" is related to U.S. patent application Ser. No. 11/725,745, filed on Mar. 19, 2007 and entitled "Systems for Conversion of Update Blocks Based on Association with Host File Management Data Structures;" is related to U.S. patent application Ser. No. 11/725,720, filed on Mar. 19, 2007 and entitled "Methods for Forcing an Update Block to Remain Sequential;" and is related to U.S. patent application Ser. No. 11/725,625, filed on Mar. 19, 2007 and entitled "Systems for Forcing an Update Block to Remain Sequential," the disclosures of which are incorporated herein by reference.

FIELD OF THE INVENTION

The present invention relates generally to memory operations and, more particularly, to methods and systems for allocation and conversion of update blocks. system may use two types of update blocks. One type is a sequential update block where data stored in such block are managed sequentially. The second type is a chaotic update block where data stored in such block are managed non-sequentially. Typically, the non-volatile memory storage system initially provides a sequential update block as destination for data received from write commands. Upon the first non-sequential write to the same logical group, the sequential update block is converted into a chaotic update block or is closed and a new update block is allocated.

In general, the conversion of a sequential update block to a chaotic update block can be time consuming because one or more blocks have to be copied from one place to another. Such conversion increases the access time of data and, as a result, should be minimized. On the other hand, to keep a sequential update block sequential, intervening valid data from an associated, partially obsolete original block may need to be copied to the sequential update block when there is a discontinuity in logical addresses. Such copying can also be time consuming if a large amount of valid data are copied. As a result, continuing efforts are being made to improve the allocation and conversion of update blocks.

SUMMARY

Various embodiments of the present invention provide methods and systems for allocation and conversion of update blocks. It should be appreciated that the embodiments can be implemented in numerous ways, including as a method, a circuit, a system, or a device. Several embodiments of the present invention are described below.

In an embodiment, a method for operating a memory system is provided. In this method, a sequential update block is provided and a write command is received to write data. The write command comprises a logical address associated with the data. If the logical address is associated with a host file management data structure, then the sequential update block is converted to a chaotic update block. After the conversion, the data are written to the chaotic update block.

Other embodiments and advantages of the invention are apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

A detailed description of one or more embodiments is provided below along with accompanying figures. The detailed description is provided in connection with such embodiments, but is not limited to any particular embodiment. The scope is limited only by the claims and numerous alternatives, modifications, and equivalents are encompassed. Numerous specific details are set forth in the following description in order to provide a thorough understanding.

These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide methods and/or systems for the allocation and conversion of update blocks. In general, the decision of whether to convert a sequential update block to a chaotic update block can be based on comparisons with a threshold value. The threshold value may be a variety of fixed values or values that are dependent on various parameters. For example, as will be explained in more detail below, the threshold value may be based on a size of preexisting data, size of data received, or other parameters. Alternatively, the decision of whether to convert a sequential update block to a chaotic update block can be based on associations with a host file management data structure. The non-volatile memory storage system may also force the sequential update block to remain sequential as much as possible.

Figure 1:
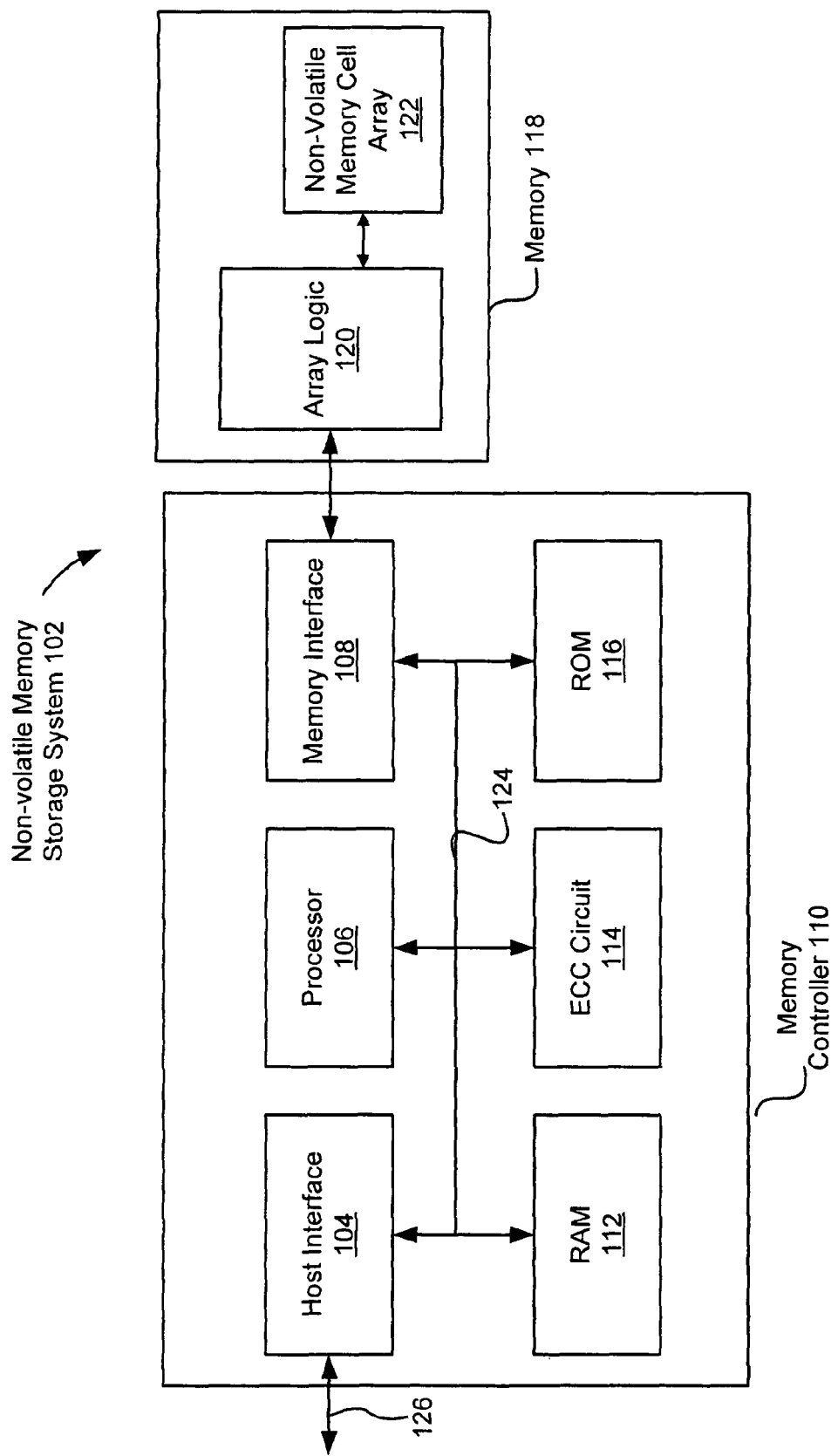
FIG. 1 is a simplified block diagram of an example of a non-volatile memory storage system, in accordance with an embodiment of the present invention.

FIG. 1 is a simplified block diagram of an example of a non-volatile memory storage system, in accordance with an embodiment of the present invention. A host system (e.g., desktop computers, audio players, digital cameras, and other computing devices) may write data to and read data from non-volatile memory storage system 102. Non-volatile memory storage system 102 may be embedded within the host or removably connected to the host. As shown in FIG. 1, non-volatile memory storage system 102 includes memory controller 110 in communication with memory 118. In general, memory controller 110 controls the operation of memory 118. Examples of operations include writing (or programming) data, reading data, erasing data, verifying data, attending to garbage collection operations, and other operations. Memory controller 110 includes bus 124 that interfaces with system bus 126 through host interface 104. Memory controller 110 further interfaces with memory 118 through memory interface 108. Host interface 104, processor 106 (e.g., microprocessor, microcontrollers, and other processors), memory interface 108, random access memory (RAM) 112, error correcting code (ECC) circuit 114, and read-only memory (ROM) 116 are in communication by way of bus 124. ROM 116 can store a storage system firmware that includes program instructions for controlling the operation of memory 118. Processor 106 is configured to execute the program instructions loaded from ROM 116 or from non-volatile memory cell array 122. The storage system firmware may be temporarily loaded into RAM 112 and additionally, the RAM may be used to buffer data that are transferred between a host and memory 118. ECC circuit 114 can check for errors passing through memory controller 110 between the host and memory 118. If errors are found, ECC circuit 114 can correct a number of error bits, the number depending on the ECC algorithm utilized.

Memory 118 can include array logic 120 and non-volatile memory cell array 122. Non-volatile memory cell array 122 may include a variety and combination of non-volatile memory structures and technologies. Examples of non-volatile memory technologies include flash memories (e.g., NAND, NOR, Single-Level Cell (SLC/BIN), Multi-Level Cell (MLC), Divided bit-line NOR (DINOR), AND, high capacitive coupling ratio (HiCR), asymmetrical contactless transistor (ACT), and other flash memories), erasable programmable read-only memory (EPROM), electrically-erasable programmable read-only memory (EEPROM), read-only memory (ROM), one-time programmable memory (OTP), and other memory technologies.

Array logic 120 interfaces memory controller 110 with non-volatile memory cell array 122 and can provide, for example, addressing, data transfer and sensing, and other support to the non-volatile memory cell array and the memory cell array. To support non-volatile memory cell array 122, array logic 120 can include row decoders, column decoders, charge pumps, word line voltage generators, page buffers, input/output buffers, address buffers, and other circuitries.

Figure 2:
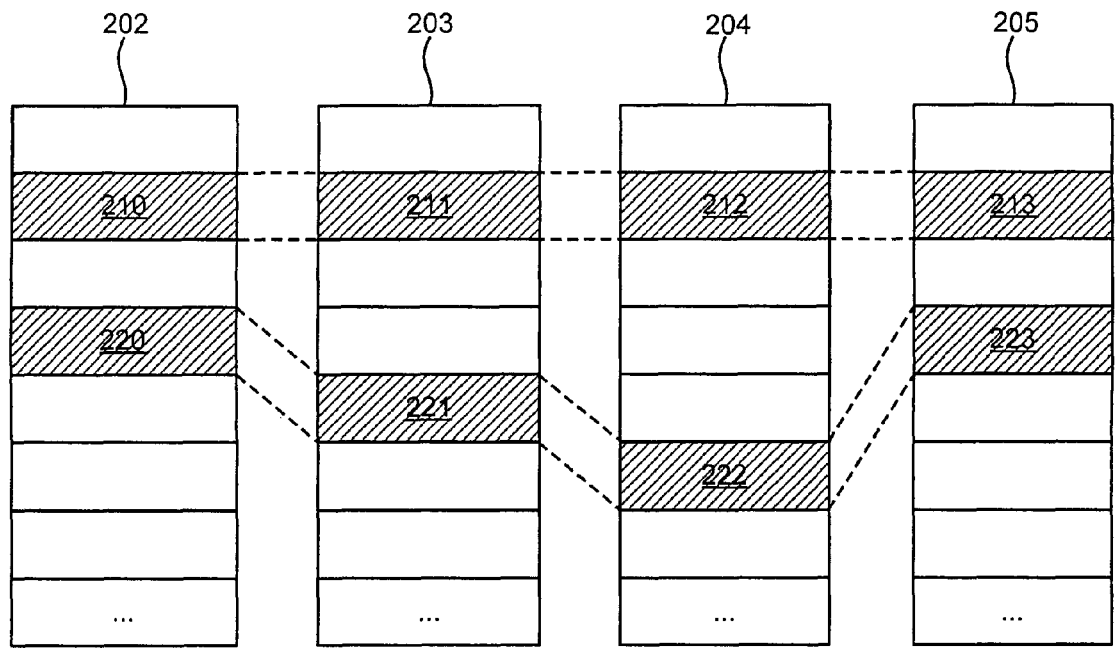
FIG. 2 is a simplified block diagram of an organization of the memory cell array into planes.

FIG. 2 is a simplified block diagram of an organization of the memory cell array into planes. One or more memory cell arrays may be divided into multiple planes or sub-arrays. In the example of FIG. 2, a memory cell array is divided into four planes 202-205. It should be appreciated that other number of planes, such as 1, 2, 4, 8, 16, or more, can exist in a non-volatile memory storage system. Each plane 202, 203, 204, or 205 may be divided into blocks of memory cells, such as blocks 210-213 and 220-223, located in respective planes 202-205. A block of memory cells is the smallest number of memory cells that are physically erasable together. For increased parallelism, the blocks can be operated in larger metablock units where one or more blocks from each plane 202, 203, 204, or 205 is logically linked together to form a metablock. For example, four blocks 210-213 can be logically linked together to form a metablock. Further, the blocks used to form a metablock can be from various locations within their respective planes, such as planes 202-205. For example, four blocks 220-223 from various locations within their respective planes 202-205 can be logically linked together to form another metablock. A metablock may extend across all four logical planes 202-205 within the non-volatile memory storage system or the non-volatile memory storage system can dynamically form metablocks from one or more blocks in one or more different planes.

Figure 3:
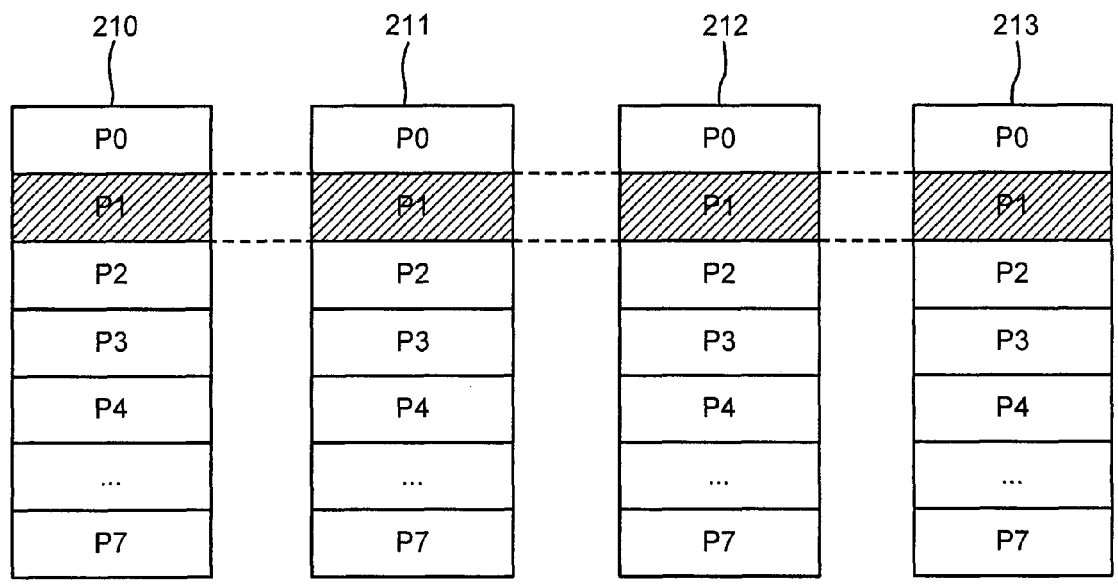
FIG. 3 is a simplified block diagram of pages of memory cells.

FIG. 3 is a simplified block diagram of pages of memory cells. Each block, such as blocks 210-213, can be further divided into pages of memory cells. As shown in FIG. 3, each block 210, 211, 212, or 213 is divided into eight pages P0-P7. Alternatively, there can be 16, 32, or more pages of memory cells within each block 210, 211, 212, or 213. To increase the operational parallelism of the non-volatile memory storage system, the pages within two or more blocks may be logically linked into metapages. For example, a metapage can be formed of one page, such as P1, from each of four blocks 210-213. A metapage can extend across all planes within the non-volatile memory storage system or the non-volatile memory storage system can dynamically form metapages from one or more pages in one or more separate blocks in one or more different planes.

Figure 4:
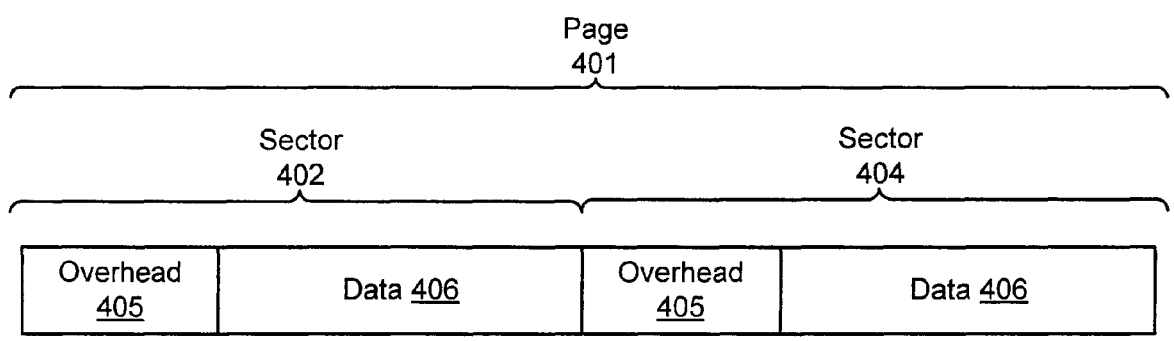
FIG. 4 is a simplified block diagram of sectors of memory cells. A page can be further divided into one or more sectors.

FIG. 4 is a simplified block diagram of sectors of memory cells. A page can be further divided into one or more sectors. The amount of data in each page can be an integer number of one or more sectors of data, where each sector may store 512 bytes of data. FIG. 4 shows page 401 divided into two sectors 402 and 404. Each sector 402 or 404 contains data 406, which can be 512 bytes in size, and overhead data 405 associated with the data. The size of overhead data 405 can be 16 bytes and can store, for example, ECC calculated from data 406 during programming, the logical address associated with the data, a count of the number of times the block has been erased and re-programmed, control flags, operating voltage levels, and other information associated with the data.

Figure 5:
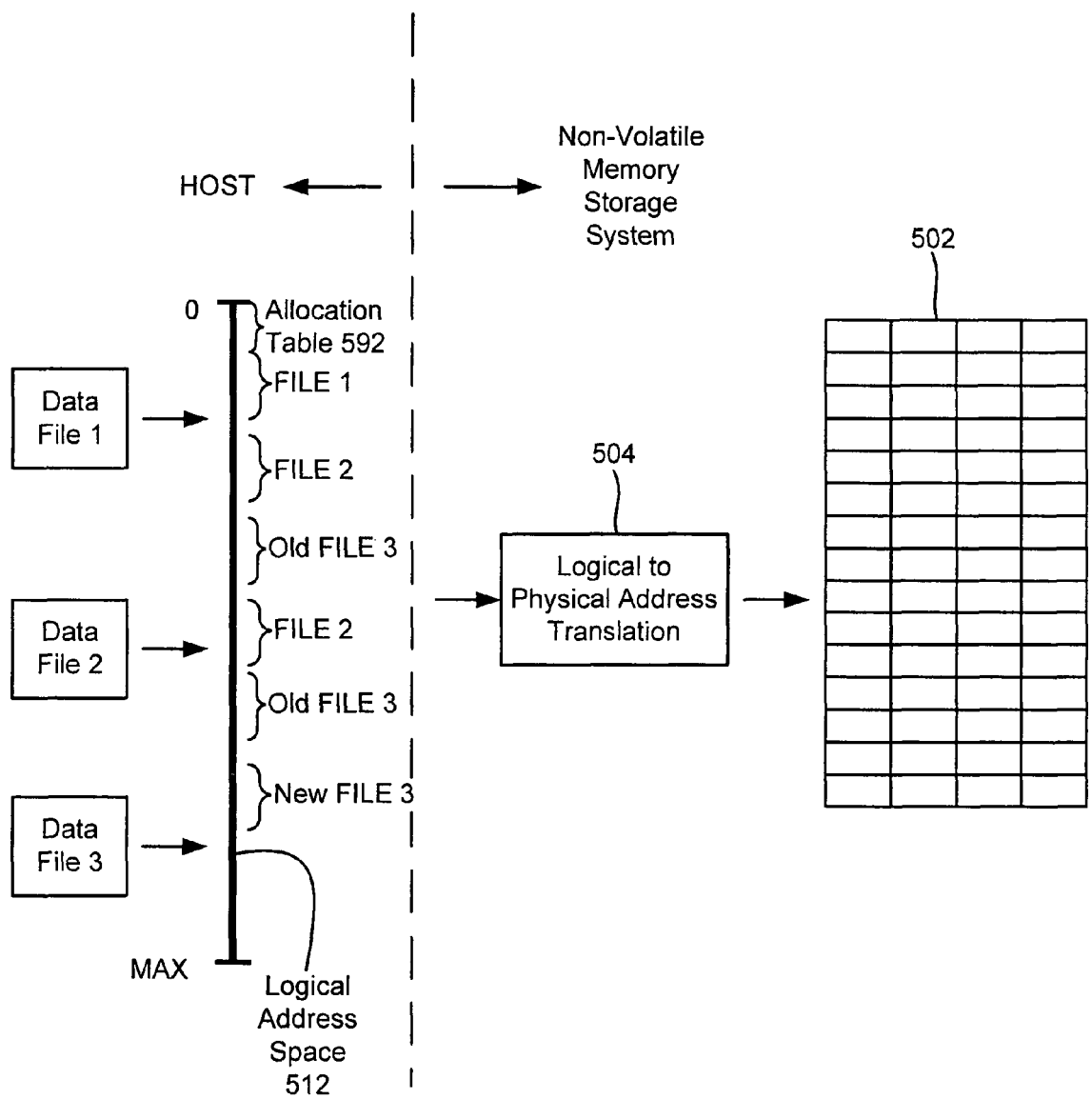
FIG. 5 is a simplified block diagram of a logical interface between a host and a non-volatile memory storage system.

FIG. 5 is a simplified block diagram of a logical interface between a host and a non-volatile memory storage system. A contiguous logical address space 512 provides addresses for data that can be stored in memory. Logical address space 512 as viewed by the host can be divided into increments of clusters of data. Each cluster may include a number of sectors of data, such as between 4 and 64 sectors.

As shown in FIG. 5, an application program executed on the host creates three data files 1, 2, and 3. Files 1, 2, and 3 can be an ordered set of data and are identified by a unique name or other reference. The host assigns a logical address space to file 1 that is not already located to other files. Here, file 1 is shown to have been assigned a contiguous range of available logical addresses.

When host creates file 2 after file 1, the host similarly assigns two different ranges of contiguous addresses within logical address space 512. Host may not assign a contiguous logical address to a file, such as file 1, 2, or 3, but can rather assign fragments of logical addresses in between logical address ranges already allocated to other files. The example of FIG. 5 shows that another file 3 is allocated a non-contiguous address range within logical address space 512, which is not previously allocated to files 1 and 2 and other data.

The host can keep track of logical address space 512 by maintaining allocation table 592 (e.g., a file allocation table (FAT)), where the logical addresses assigned by the host to the various data files, such as files 1-3, by conversion are maintained. The host references files 1-3 by their logical addresses and not by the physical locations where the non-volatile memory storage system stores the files. On the other hand, the non-volatile memory storage system references files 1-3 by portions of the logical addresses to which data have been written and does not reference the files by the logical addresses allocated to the files. The non-volatile memory storage system converts the logical addresses provided by the host into unique physical addresses within memory cell array 502 where data from the host are stored. Block 504 represents a table of these logical-to-physical address conversions, which is maintained by the non-volatile memory storage system.

Conversion Based on Comparison with a Threshold Size

Figure 6:
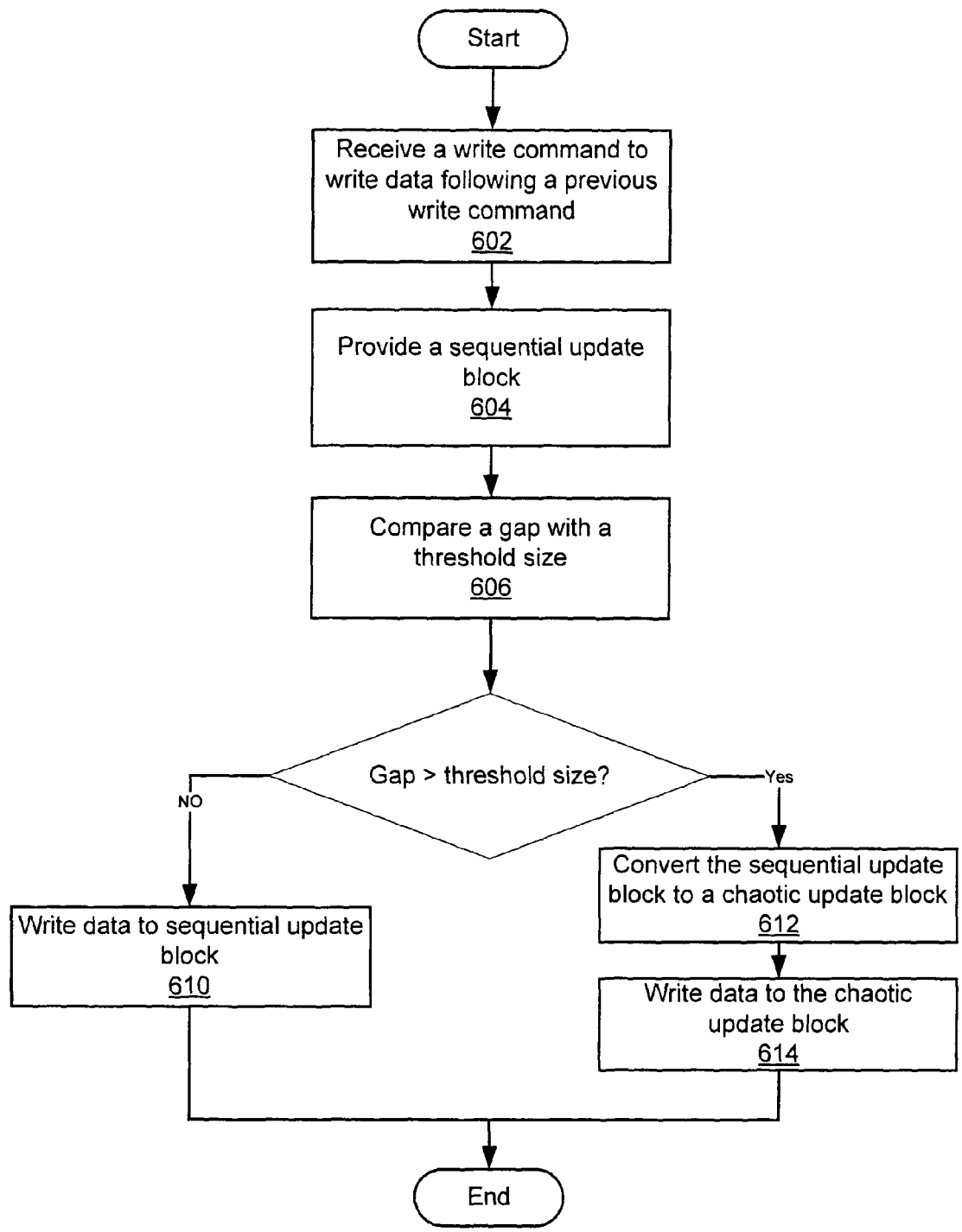
FIG. 6 is a flowchart diagram of a general overview of operations for converting a sequential update block to a chaotic update block, in accordance with an embodiment of the present invention.

FIG. 6 is a flowchart diagram of a general overview of operations for converting a sequential update block to a chaotic update block, in accordance with an embodiment of the present invention. At 602, a write command is received by the non-volatile memory storage system to write data to memory. The write command can be a single sector write command or a multiple sectors write command. In a single sector write command, data can be written as single sectors to random logical addresses across a memory. In a multiple sectors write command, multiple sectors of data having contiguous, logical addresses are written to the memory. This received write command follows a previous write command. The write command and the previous write command are two, separate write commands. Here, the write command and the previous write command have a discontinuity in logical addresses. In other words, the beginning or first logical address associated with the write command is not contiguous with the ending or last logical address associated with the previous write command. As a result, there is a logical address jump between the write command and the previous write command. The logical address space between the write command and the previous write command defines a gap. In other words, the discontinuity in logical addresses defines a gap between the logical address of the write command and the logical address of the previous write command. For example, the gap can be the logical address space between the new sector of the received write command and the last valid sector of the previous write command.

A sequential update block is provided for the write command at 604. In general, data received from a write command may be written to one or more update blocks. An update block can be managed to receive data in either sequential order or chaotic order (i.e., non-sequential order). It should be appreciated that a sequential update block may be one or more blocks (e.g., a metablock) provided or allocated when a write command is received from the host to write data that fill one or more physical page in a logical group for which all valid sectors are currently located in the same metablock. A logical group is a group of logical addresses with a size that may equal to the size of a metablock. Sectors of data written to the sequential update block are written sequentially in logical addressing such that the data supersede the corresponding logical data written in the original block. Data updated in this logical group can be written to this sequential update block, until the sequential update block is either closed or converted to a chaotic update block. It should be noted that the sequential update block is considered closed when the last physical data location of the sequential update block is written. In other words, closure of the sequential update block may result from the sequential update block being completely filled by updated sector data written by the host or copied from the original block.

On the other hand, a chaotic update block allows sectors of data to be updated in a random order within a logical group, and with any repetition of individual sectors. As will be explained in more detail below, the chaotic update block can be created by conversion from a sequential update block when data written by a host is logically non-sequential to the previously written data within the logical group being updated. Data subsequently updated in this logical group are written in the next available data location in the chaotic update block, whatever their logical address within the group.

At 606, the gap then is compared with a threshold size. The threshold size may be a fixed value or a value that is based on or dependent on a parameter. As will be explained in more detail below, in an embodiment, the threshold size may be based on the size of the data associated with the write command. In another embodiment, the threshold size may be based on the size of preexisting data stored in the sequential update block. In yet another embodiment, the threshold size may be based on the size of the data and the size of the preexisting data. As shown in FIG. 6, if the gap is less than the threshold size, then the data are written to the sequential update block at 610. As will be explained in more detail below, the data are written to the sequential update block in a logically sequential order. On the other hand, if the gap exceeds the threshold size, then the sequential update block is converted to a chaotic update block at 612. After the conversion, the data are written to the chaotic update block at 614 in an order that is different from a logically sequential order (i.e., a non-sequential order).

Figure 7A:
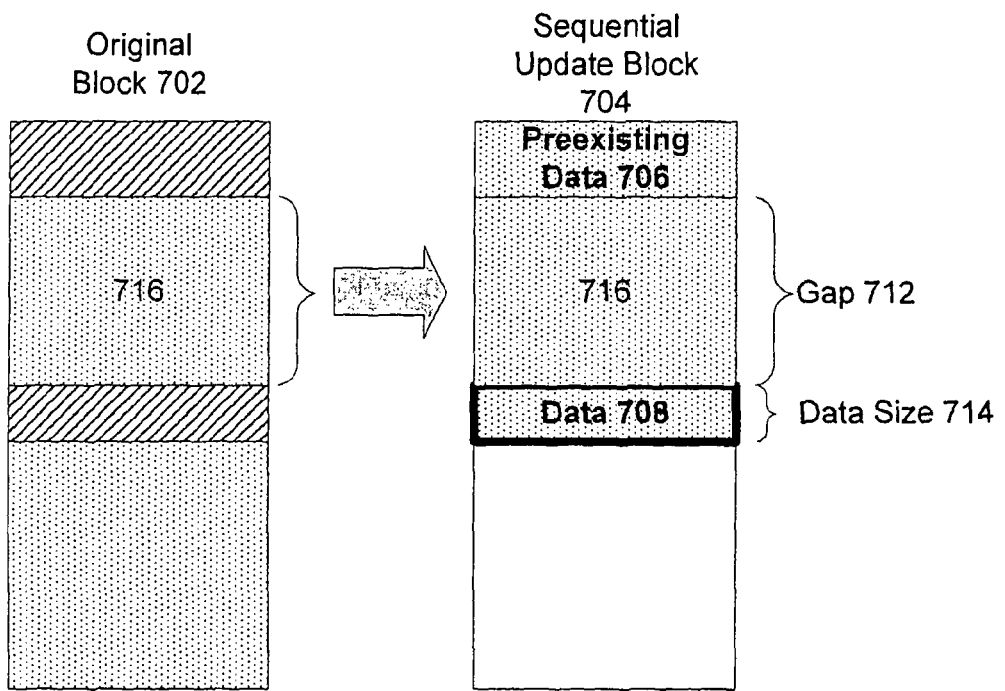
FIGS. 7A and 7B are simplified block diagrams illustrating the use of a threshold value that is based on a size of data from a write command, in accordance with an embodiment of the present invention.
Figure 7B:
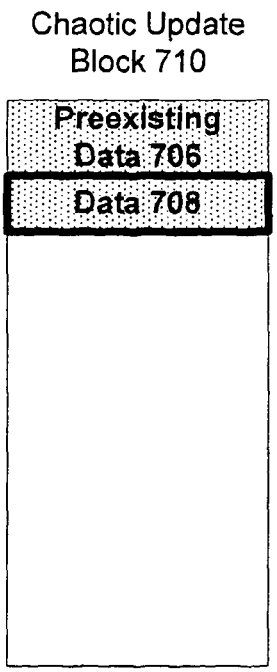

FIGS. 7A and 7B are simplified block diagrams illustrating the use of a threshold value that is based on a size of data from a write command, in accordance with an embodiment of the present invention. As shown in FIG. 7A, when a write command to write data 708 is received, sequential update block 704 is provided or allocated to receive the data. Sequential update block 704 comprises or includes preexisting data 706 that were written to the sequential update block from one or more previous write commands. Here, the received write command and the previous write command have a discontinuity in logical addresses. In other words, the logical address associated with the write command is not contiguous with the logical address associated with the previous write command. Gap 712 therefore exists between the logical address of the write command and the logical address of the previous write command.

After the write command is received, a comparison is made between gap 712 and a threshold size. In this embodiment, the threshold size is based on size 714 of data 708 received. In other words, the threshold size can be expressed as $$\text{Threshold Size} = f(\text{size of data})$$

where the threshold size is a function of size 714 of data 708. It should be noted that the write command can include information defining size 714 of data 708. For example, information can include the beginning logical address of data 708 and the length of the data. In another example, information can include the beginning logical address of data 708 and the ending logical address of the data. Size 714 of data 708 can be derived from the beginning and ending logical addresses. Threshold size may include a variety of functions that are based on size 714 of data 708. For example, the threshold size can be expressed as $$\text{Threshold Size} = \text{Size of Data/Fixed Value}$$

where the fixed value can be 4, 8, 16, 32, or other fixed values. The fixed value can be empirically derived based on the type of application (e.g., cameras, music players, and other applications) the non-volatile memory storage system is used.

The comparison of gap 712 with threshold size may reveal that the gap is less than the threshold size. If the gap is less than the threshold size, then data 708 are written to sequential update block 704. Before data 708 are written, gap 712 is filled with valid data 716 from original block 702 or made-up data (e.g., zeros) if no valid data exist. Gap 712 is filled to preserve the sequential nature of sequential update block 704. Original block 702 is associated with sequential update block and it should be noted that data, such as preexisting data 706 and data 708, written to the sequential update block are written sequentially in logical addressing such that the data written in sequential update block 704 supersede the corresponding logical data written in the original block. Data updated in this logical group can be written to sequential update block 704, until the sequential update block is either closed or converted to a chaotic update block. As such, original block 702 can include invalid data (data that have been superseded) and valid data (data that have not been superseded), which is represented in FIG. 7A by hatched pattern and dotted pattern, respectively. To fill gap 712, valid data 716 from original block 702 that are associated with the gap are copied from the original block to sequential update block 704. After gap 712 is filled, data 708 are written to sequential update block 704.

On the other hand, if gap 712 exceeds the threshold size, then sequential update block 704 is converted to chaotic update block 710, as shown in FIG. 7B. Chaotic update block 710 allows sectors of data to be updated in a random order within a logical group. As a result, after the conversion, FIG. 7B shows that data 708 can be directly written to chaotic update block 710 without further need to fill gap 712.

Figure 8A:
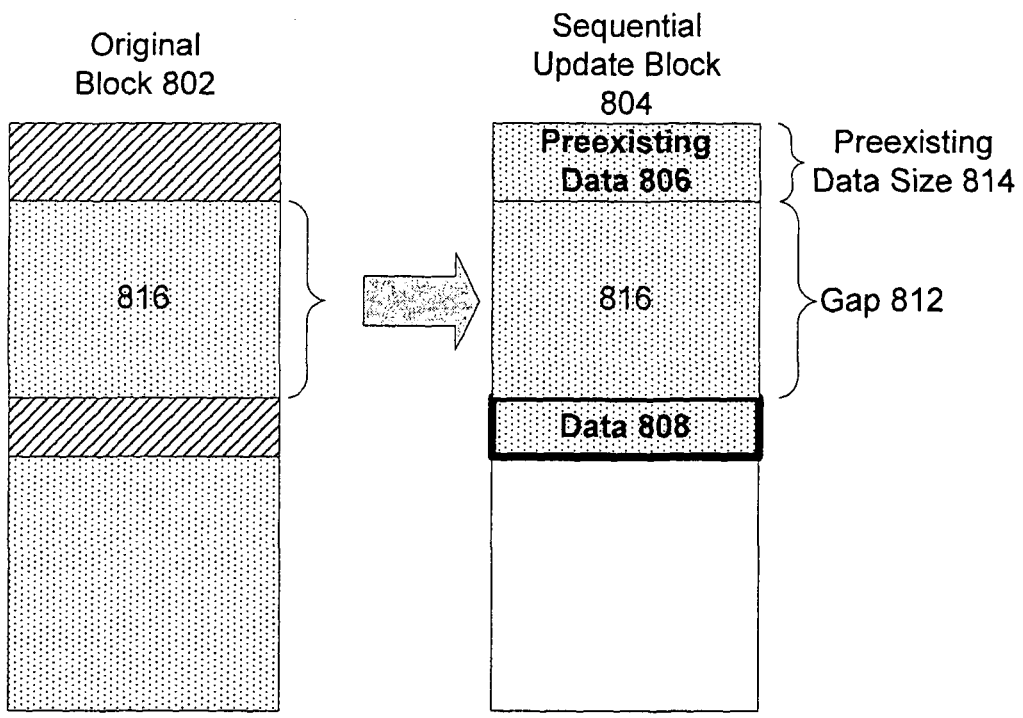
FIGS. 8A and 8B are simplified block diagrams illustrating the use of a threshold value that is based on a size of preexisting data, in accordance with an embodiment of the present invention.
Figure 8B:
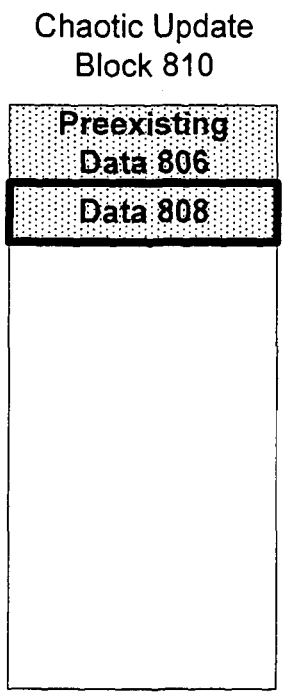

FIGS. 8A and 8B are simplified block diagrams illustrating the use of a threshold value that is based on a size of preexisting data, in accordance with an embodiment of the present invention. As shown in FIG. 8A, when a write command to write data 808 is received, sequential update block 804 is provided or allocated to receive the data. Sequential update block 804 comprises or includes preexisting data 806 that were written to the sequential update block from one or more previous write commands. Here, the received write command and the previous write command have a discontinuity in logical addresses. Gap 812 therefore exists between the logical address of the write command and the logical address of the previous write command.

After the write command is received, size 814 of preexisting data stored in sequential update block 804 is read. Thereafter, a comparison is made between gap 812 and a threshold size. In this embodiment, the threshold size is based on size 814 of preexisting data 806 stored in sequential update block 804. In other words, the threshold size can be expressed as $$\text{Threshold Size} = f(\text{size of preexisting data})$$

where the threshold size is a function of size 814 of preexisting data 806. Threshold size may include a variety of functions that are based on size 814 of preexisting data 806. For example, the threshold size can be expressed as $$\text{Threshold Size} = (\text{Size of Preexisting Data/Block Size}) * \text{Gain} + \text{Offset}$$

where block size is the size of sequential update block 804 (e.g., total number of sectors in a metablock). The gain can be empirically derived based on the type of application (e.g., cameras, music players, and other applications) the non-volatile memory storage system is used. The gain also can be empirically derived based on the type of non-volatile memory structures and technologies used (e.g., NAND, MLC, SLC, and other structures and technologies). For example, gain can be 4, 8, 16, 32, or other values. Similarly, the offset may be empirically derived based on the type of application the non-volatile memory storage system is used. For example, offset can be 1 metapage, 2 metapages, or other values.

The comparison of gap 812 and threshold size may reveal that the gap is less than the threshold size. If the gap is less than the threshold size, then data 808 are written to sequential update block 804. Before data 808 are written, gap 812 is filled with valid data 816 from original block 802 or made-up data if no valid data exist to preserve the sequential nature of sequential update block 804. As discussed above, to fill gap 812, valid data 816 from original block 802 that are associated with the gap are copied from the original block to sequential update block 804. After gap 812 is filled, data 808 received are written to sequential update block 804.

On the other hand, as shown in FIG. 8B, if gap 812 exceeds the threshold size, then sequential update block 804 is converted to chaotic update block 810. Chaotic update block 810 allows sectors of data to be updated in a random order within a logical group. As a result, after the conversion, FIG. 8B shows that data 808 can be directly written to chaotic update block 810 without further need to fill gap 812.

Figure 9A:
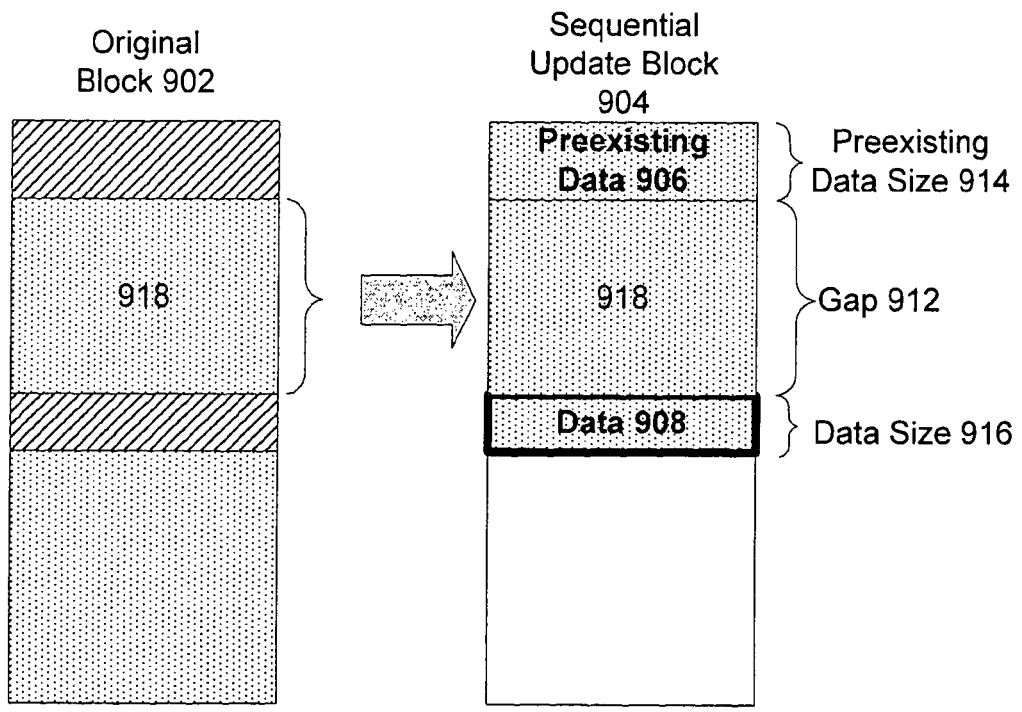
FIGS. 9A and 9B are simplified block diagrams illustrating the use of a threshold value that is based on sizes of received data and preexisting data, in accordance with an embodiment of the present invention.
Figure 9B:
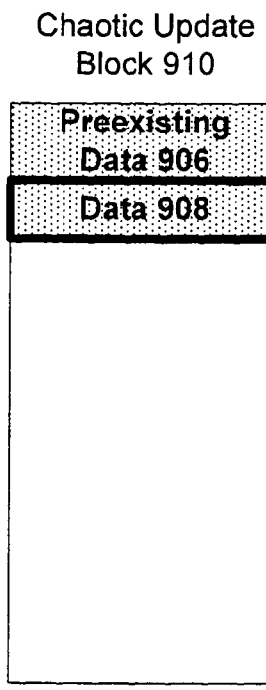

FIGS. 9A and 9B are simplified block diagrams illustrating the use of a threshold value that is based on sizes of received data and preexisting data, in accordance with an embodiment of the present invention. As shown in FIG. 9A, when a write command to write data 908 is received, sequential update block 904 is provided or allocated to receive the data. Sequential update block 904 comprises or includes preexisting data 906 that were written to the sequential update block from one or more previous write commands. Here, the received write command and the previous write command have a discontinuity in logical addresses. Gap 912 therefore exists between the logical address of the write command and the logical address of the previous write command.

After the write command is received, size 914 of preexisting data 906 stored in sequential update block 904 is read. Thereafter, a comparison is made between gap 912 and a threshold size. In this embodiment, the threshold size is based on size 916 of received data 908 and size 914 of preexisting data 906 stored in sequential update block 904. In other words, the threshold size can be expressed as $$\text{Threshold Size} = f(\text{size of data}, \text{size of preexisting data})$$

where the threshold size is a function of size 916 of received data 908 and size 914 of preexisting data 906. As noted above, the write command can include information defining the size of data 908. Here, threshold size may include a variety of functions that are based on size 916 of data 908 and size 914 of preexisting data 906.

The comparison of gap 912 and threshold size may reveal that the gap is less than the threshold size. If the gap is less than the threshold size, then data 908 are written to sequential update block 904. As discussed above, before data 908 are written, gap 912 is filled with valid data 918 from original block 902 or made-up data if no valid data exist to preserve the sequential nature of sequential update block 904. After gap 912 is filled, data 908 received are written to sequential update block 904. On the other hand, as shown in FIG. 9B, if gap 912 exceeds the threshold size, then sequential update block 904 is converted to chaotic update block 910. After the conversion, data 908 can be directly written to chaotic update block 910 without further need to fill gap 912.

Figure 10:
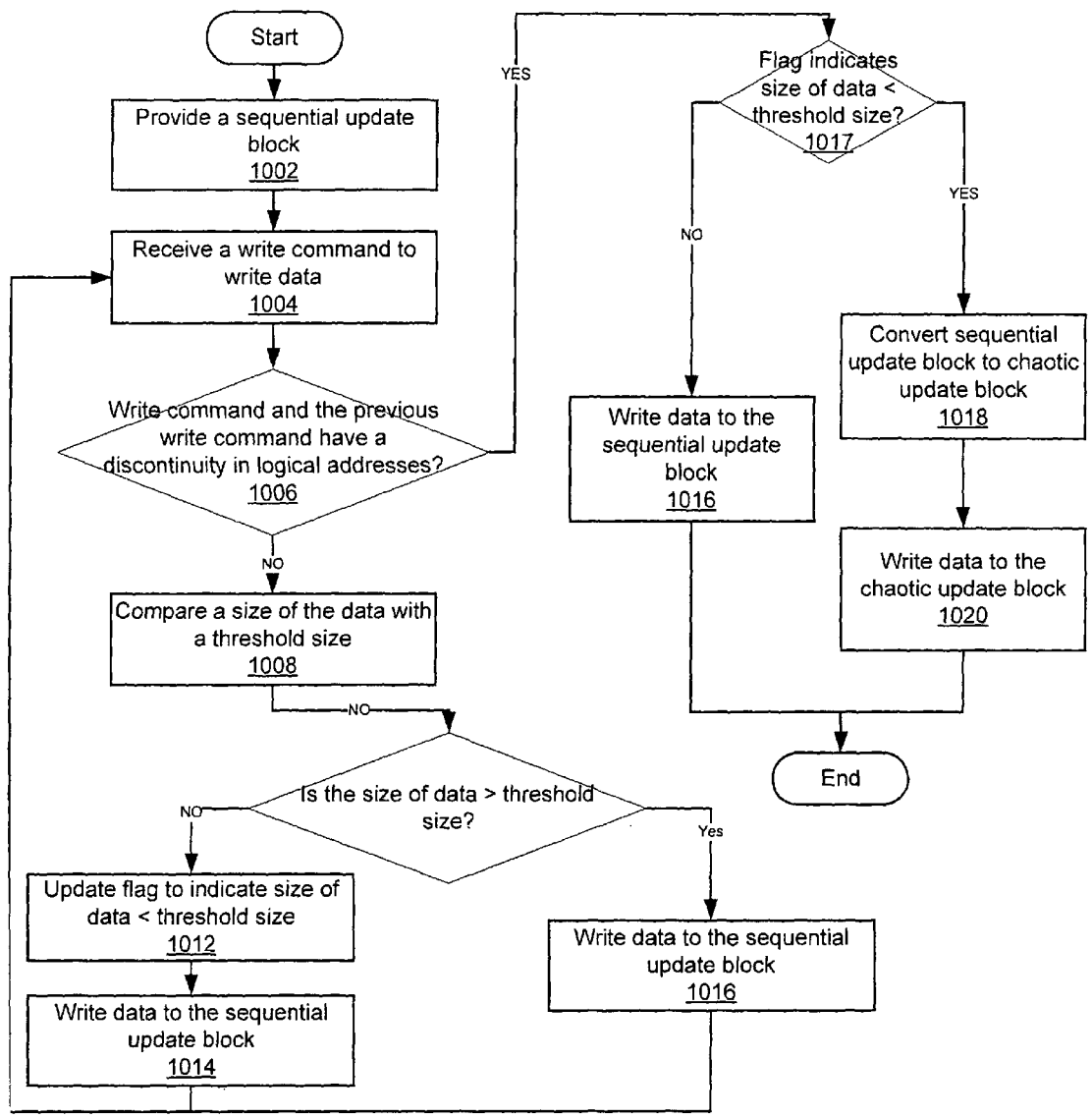
FIG. 10 is a flowchart diagram of a general overview of operations for converting a sequential update block to a chaotic update block, in accordance with another embodiment of the present invention.

FIG. 10 is a flowchart diagram of a general overview of operations for converting a sequential update block to a chaotic update block, in accordance with another embodiment of the invention. Starting at 1002, a sequential update block is provided. A write command to write data is received at 1004 and the write command may include information that defines a size of the data to be written. At 1006, a determination is made as to whether the received write command and the previous write command, which came immediately before the write command, have a discontinuity in logical addresses. If there is no discontinuity in logical addresses (i.e., contiguous logical addresses), then the size of the data received is compared with a threshold size at 1008. Here, the threshold size may be a variety of values. For example, the threshold size may be a fixed value that is empirically determined based on the type of application used.

If the size of the data received is less than the threshold size, then a flag, for example, stored in the non-volatile memory storage system may be updated at 1012 to indicate that the size of data is less than the threshold size. A variety of flag values may be used. For example, a flag with a value of 1 can indicate that the size of data is less than the threshold size. In contrast, a flag with a value of 0 indicates that the size of data exceeds (or is greater than) the threshold size. Vice versa, a flag with a value of 0 can indicate that the size of data is less than the threshold size and a value of 1 can indicate that the size of data exceeds the threshold size. After the flag is updated, the received data are written to the sequential update block at 1014.

On the other hand, if the size of data exceeds the threshold size, then data are written to the sequential update block at 1016 without updating the flag, assuming that the default value of the flag indicates that the size of data exceeds the threshold size. As a result, if any data received per write command have a size that is less than the threshold size, then flag is updated. The flag therefore indicates that at least one of many write commands received has data with a size that is less than the threshold size. However, if none of the data received has a size that is less than the threshold size, then the flag is not updated. It should be noted that the flag can also be configured to trigger when at least two or more write commands received have data with sizes that are less than the threshold size. In this embodiment, the flag can include multiple bits. Each bit can be updated or switched with every write command received that has data with a size that is less than the threshold size. At 1016, the flag indicates that none of the write commands received has data with a size that is less than the threshold size. After the data are written to the sequential update block, the non-volatile memory storage system is configured to receive another write command at 1004.

Returning to 1006, if the write command and the previous write command have a discontinuity in logical addresses, then the value of the flag, as discussed above, is read. At 1017, if the flag indicates that the size of at least one preexisting data, which is associated with one preexisting write command, exceeds the threshold size, then the received data are directly written to the sequential update block. However, if the flag indicates that all sizes of data associated with multiple previous write commands are less than the threshold size, then the sequential update block is converted to a chaotic update block at 1018. After the conversion, the received data are written to the chaotic update block at 1020.

Figure 11A:
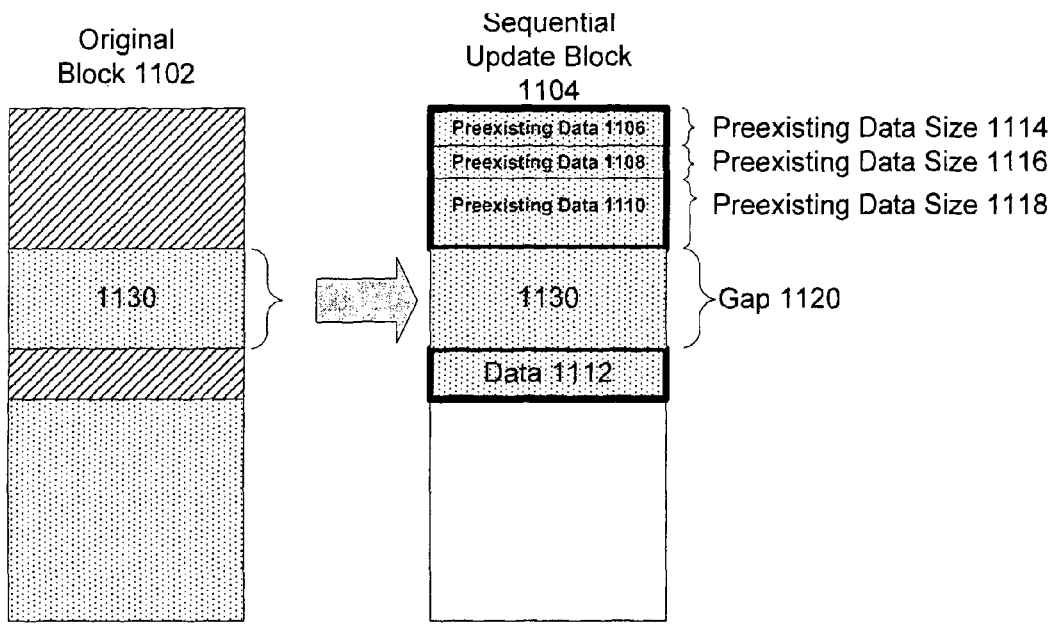
FIGS. 11A and 11B are simplified block diagrams illustrating the conversion policy discussed in FIG. 10, in accordance with an embodiment of the present invention.
Figure 11B:
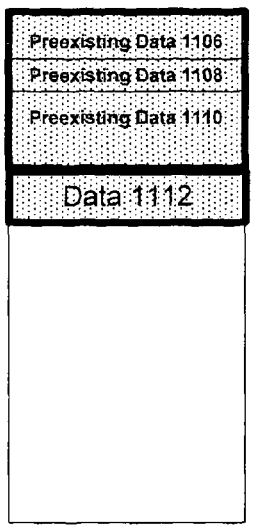

FIGS. 11A and 11B are simplified block diagrams illustrating the conversion policy discussed in FIG. 10, in accordance with an embodiment of the present invention. As shown in FIG. 11A, when a write command to write data 1112 is received, sequential update block 1104 is provided or allocated to receive the data. Sequential update block 1104 comprises or includes preexisting data 1106, 1108, and 1110 that were written to the sequential update block from three previous write commands. Here, the received write command and the previous write command associated with preexisting data 1110 have a discontinuity in logical addresses. Gap 1120 therefore exists between the logical address of the write command and the logical address of the previous write command.

As a result of the discontinuity in logical addresses, the value of a flag is read. As discussed above, the flag indicates whether at least one of the three write commands previously received has data (i.e., preexisting data 1106, 1108, 1110) with a size 1114, 1116, or 1118 that is less than the threshold size. The flag is updated or set based on comparisons of the size 1114, 1116, or 1118 of each preexisting data 1106, 1108, or 1110 received with a threshold value. If one preexisting data 1106, 1108, or 1110 has a size 1114, 1116, or 1118 that is less than the threshold size, then the flag can be updated accordingly.

Assuming that the flag indicates that none of the sizes 1114, 1116, and 1118 is less than the threshold size (i.e., all three sizes 1114, 1116, and 1118 exceed the threshold size), then the received data 1112 are written to sequential update block 1104. Before data 1112 are written, gap 1120 is filled with valid data 1130 from original block 1102 or made-up data if no valid data exist to preserve the sequential nature of sequential update block 1104. After gap 1120 is filled, data 1112 received are written to sequential update block 1104. Before data 1112 are written, gap 1120 is filled with valid data 1130 from original block 1102 or made-up data if no valid data exist to preserve the sequential nature of sequential update block 1104. After gap 1120 is filled, data 1112 received are written to sequential update block 1104. On the other hand, as shown in FIG. 11B, if flag indicates that a size 1114, 1116, or 1118 of preexisting data 1106, 1108, or 1110 is less than the threshold size, then sequential update block 1104 is converted to chaotic update block 1122. After the conversion, data 1112 can be directly written to chaotic update block 1122 without further need to fill gap 1120.

Conversion Based on Association with a Host File Management Data Structure

Figure 12:
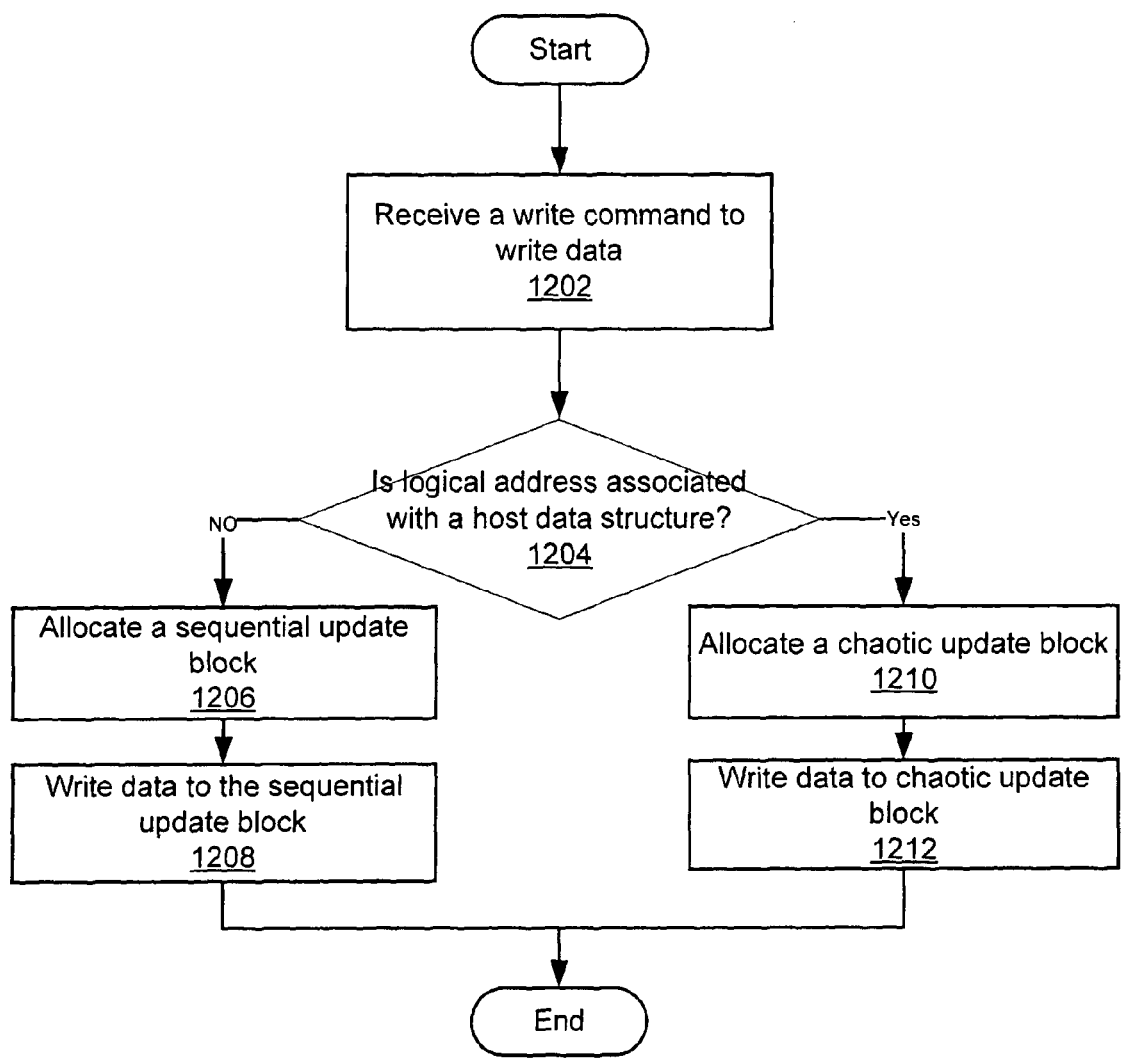
FIG. 12 is a flowchart diagram of a general overview of operations for converting a sequential update block to a chaotic update block based on associations with a host file management data structure, in accordance with an embodiment of the present invention.

FIG. 12 is a flowchart diagram of a general overview of operations for converting a sequential update block to a chaotic update block based on associations with a host file management data structure, in accordance with an embodiment of the invention. A write command to write data is received at 1202. Along with the data, the write command also includes the logical address associated with the data. After the write command is received, a determination is made at 1204 as to whether the logical address of the write command is associated with a host file management data structure. In other words, a determination is made as to whether the data received are to be written to sectors designated to be used for a host file management data structure. A host file management data structure is a data structure that is used to maintain and/or manage data stored in a non-volatile memory storage system. An example of a host file management data structure is an allocation table. The allocation table is a table that points to locations within the non-volatile memory storage system and provides a map of addresses of one or more files stored in the non-non-volatile memory storage system. As discussed above, the allocation table allows a host to keep track of the logical address space assigned by the host to various files. Examples of allocation tables include FAT16, FAT32, NTFS, exFAT Linux, and other allocation tables. Another example of a host file management data structure is a file directory. The file directory includes information regarding a list of files or a description of characteristics of a particular file. The host file management data structure can also include, for example, various file attribute structures used by the host. For example, the file attribute structures may be associated with digital rights management (DRM), which is used to manage the digital rights of data stored in the non-volatile memory storage system.

In the embodiment shown in FIG. 12, if the logical address of the write command is not associated with a host file management data structure, then a sequential update block is allocated at 1206. After the allocation, the data are written to the sequential update block at 1208. On the other hand, if the logical address of the write command is associated with a host file management data structure, then a chaotic update block is allocated instead at 1210. In general, data associated with host file management data structure are random in nature. As a result, a chaotic update block is allocated to receive data that are associated with a host file management data structure. After the allocation, the data are written to the chaotic update block at 1212.

In another embodiment, a sequential update block initially is provided. Here, if the logical address of the write command is not associated with a host file management data structure, then the data are written to the sequential update block. However, if the logical address of the write command is associated with a host file management data structure, then the sequential update block is converted to a chaotic update block. After the conversion, the data are written to the chaotic update block.

It should be noted that the sizes of the host file management data structure are not fixed. The sizes may be determined during format and varies with a cluster size (a cluster is a group of sectors) and the size of the non-volatile memory cell array. One example to determine whether data are associated with, for example, an allocation table is to assume that a certain range of logical addresses are used for or associated with the allocation table. The blocks that are not associated with the allocation table are managed as sequential data.

Forcing the Update Blocks to be Sequential

Figure 13:
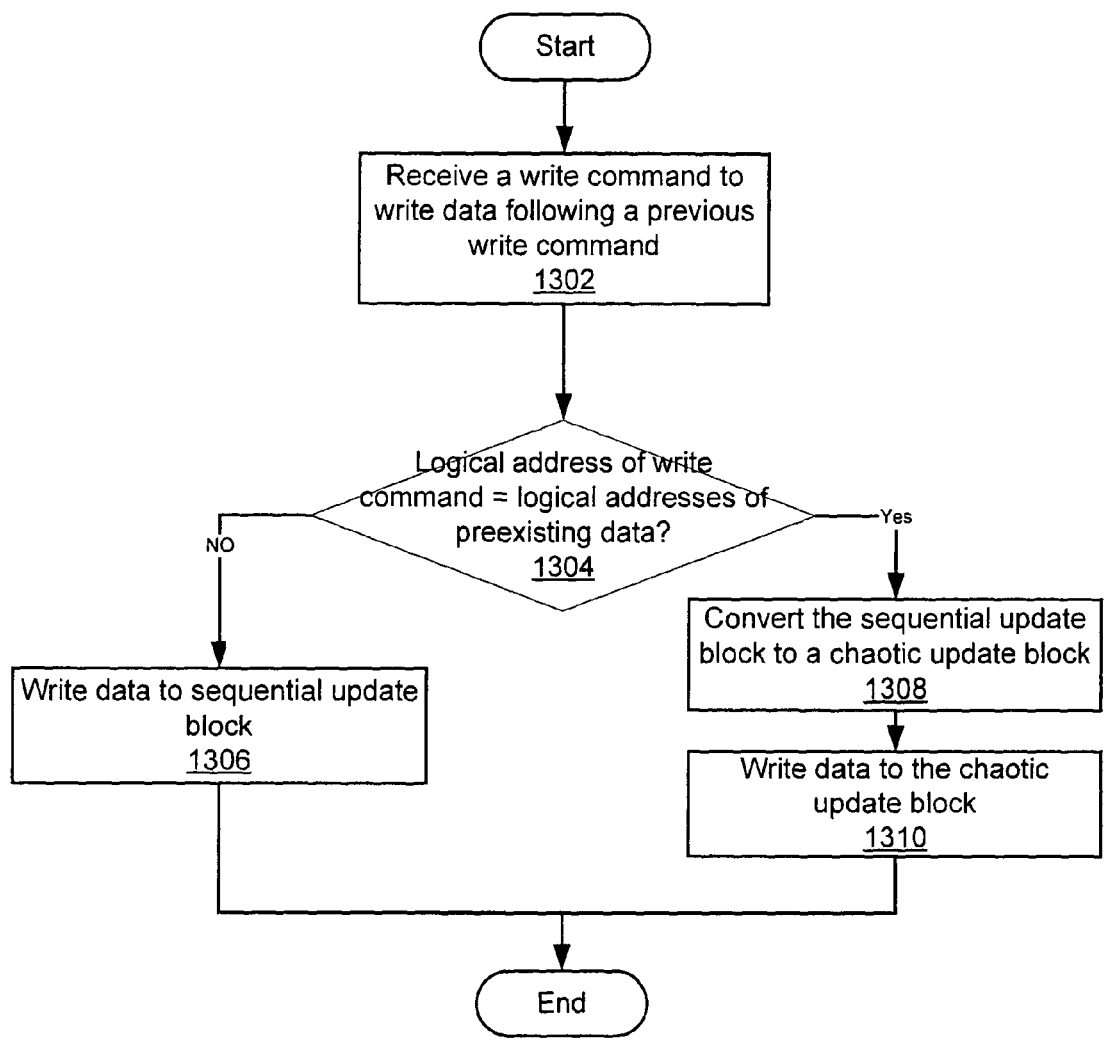
FIG. 13 is a flowchart diagram of a general overview of operations for forcing an update block to be sequential, in accordance with an embodiment of the present invention.

FIG. 13 is a flowchart diagram of a general overview of operations for forcing an update block to be sequential, in accordance with an embodiment of the invention. A write command to write data is received at 1302 following a previous write command. A sequential update block and preexisting data associated with the sequential update block are provided. Here, data may be written to a sequential update block or a chaotic update block. Thus, an option is provided to convert the sequential update block to a chaotic update block.

If the write command and the previous write command have a discontinuity in logical addresses, then a determination is made at 1304 as to whether the logical address of the write command matches the logical addresses of the preexisting data. If the logical address of the write command is different from the logical address of the preexisting data, then the data are not to be written over the preexisting data. In other words, the data and the preexisting data do not overlap. This may occur, for example, in a forward address transition where the data are written to logical addresses that are located after the logical addresses of the preexisting data. If there are no overlaps, then the data are written to the sequential update block at 1306. As discussed above, before data are written to the sequential update block, a gap resulting from the discontinuity in logical addresses is filled with valid data from an original block associated with the sequential update block or made-up data if no valid data exist to preserve the sequential nature of sequential update block. After the gap is filled, the data received are written to the sequential update block at 1306.

On the other hand, if the logical address of the write command matches one of the logical addresses of the preexisting data, then the data are to be written over the preexisting data, thereby rendering the preexisting data obsolete or invalid. This may occur in a backward address transition where, for example, data written by a host leads to an update to a previously written meta-page within the logical group being updated. If there is an overlap, as shown in FIG. 13, the sequential update block is converted to a chaotic update block at 1308. After the conversion, the data are written to the chaotic update block at 1310.

Although the foregoing embodiments have been described in some detail for purposes of clarity of understanding, the embodiments are not limited to the details provided. There are many alternative ways of implementing the embodiments. Accordingly, the disclosed embodiments are to be considered as illustrative and not restrictive, and the embodiments are not to be limited to the details given herein, but may be modified within the scope and equivalents of the appended claims. In the claims, elements and/or operations do not imply any particular order of operation, unless explicitly stated in the claims.

What is claimed is:

1. A method for operating a memory system comprising an array of memory cells and a memory controller and that is connected to a host, comprising:

providing a sequential update block in the memory system;

receiving a write command from the host to write data in the memory system, the write command comprising a logical address associated with the data;

prior to writing the data in the array of memory cells of the memory system, the memory controller determining that the logical address of the data for the write command is designated for storage of a host file management data structure corresponding to the data for the write command;

the determination that the logical address of the data for the write command is designated for storage of the host file management data structure causing conversion of the sequential update block to a chaotic update block; and writing the data for the write command to the chaotic update block.

2. The method of claim 1, further comprising:

providing a second sequential update block after the chaotic update block is closed;

receiving a second write command from the host to write second data in the memory system, the second write command comprising a second logical address associated with the second data;

prior to writing the second data in the array of memory cells of the memory system, the memory controller determining that the second logical address of the second data received in the second write command is not designated for storage of a host file management data structure;

after determining that the second logical address of the second data received in the second write command is not designated for storage of a host file management data structure, writing the second data to the second sequential update block.

3. The method of claim 1, wherein the host file management data structure is an allocation table.

4. The method of claim 1, wherein the host file management data structure is a file directory.

5. A method for operating a memory system comprising an array of memory cells and a memory controller and that is connected to a host, comprising:

the memory system receiving a write command from the host to write data, the write command comprising a logical address allocated by the host to the data;

the memory controller determining that the logical address is allocated by the host for storage of a host file management data structure corresponding to the data for the write command and such determination causing allocation of a chaotic update block into which the data of for the write command is to be stored; and the memory controller writing the data for the write command to the chaotic update block.

6. The method of claim 5, further comprising:

the memory system receiving a second write command from the host to write second data, the second write command comprising a second logical address allocated by the host to the second data;

the memory controller determining that the second logical address is not allocated by the host for storage of a host file management data structure;

after determining that the second logical address is not allocated by the host for storage of a host file management data structure, allocating a sequential update block into which data of the second write command is to be stored; and writing the data to the sequential update block.

7. The method of claim 5, wherein the host file management data structure is a file directory.

8. A non-volatile memory storage system, comprising:
a non-volatile memory cell array; and
a memory controller configured to:
receive a write command to write data, the write command comprising a logical address associated with the data, determine that the logical address is allocated by the host for storage of a host file management data structure corresponding to the data for the write command;

and such determination cause allocation of a chaotic update block in the non-volatile memory cell array into which the data for the write command is to be stored, and write the data for the write command to the chaotic update block.

9. The method of claim 8, wherein the memory controller is further configured to:

receive a second write command from the host to write second data, the second write command comprising a second logical address allocated by the host to the second data;

determine that the second logical address is not allocated by the host for storage of a host file management data structure;

after determining that the second logical address is not allocated by the host for storage of a host file management data structure, allocate a sequential update block into which the second data of the second write command is to be stored; and write the second data to the sequential update block.

10. The non-volatile memory storage system of claim 8, wherein the host file management data structure is an allocation table.

11. The non-volatile memory storage system of claim 8, wherein the host file management data structure is a file directory.

12. A non-volatile memory storage system, comprising:
a non-volatile memory cell array; and
a memory controller communicatively coupled with the non-volatile memory cell array, the memory controller being configured to
provide a sequential update block,
receive a write command to write data, the write command comprising a logical address associated with the data, prior to writing the data, determine that the logical address of the data for the write command is designated for storage of a host file management data structure corresponding to the data for the write command, the determination that the logical address of the data for the write command is designated for storage of the host file management data structure cause conversion of the sequential update block to a chaotic update block, and write the data for the write command to the chaotic update block.

* * * * *